(12) United States Patent
Salman et al.

(10) Patent No.: US 8,645,341 B2
(45) Date of Patent: Feb. 4, 2014

(54) METHOD AND SYSTEM FOR AUTOMATICALLY UPDATING A SOFTWARE QA TEST REPOSITORY

(75) Inventors: Emad Salman, San Francisco, CA (US); Mark Nelson, Incline Village, NV (US); Steven Scott Lawrance, San Francisco, CA (US); Daniel P Kador, San Francisco, CA (US)

(73) Assignee: Salesforce.com, Inc., San Francisco, CA (US)

( * ) Notice: Subject to any disclaimer, the term of this patent is extended or adjusted under 35 U.S.C. 154(b) by 421 days.

(21) Appl. No.: 12/798,187

(22) Filed: Mar. 31, 2010

(65) Prior Publication Data

US 2011/0246540 A1 Oct. 6, 2011

(51) Int. Cl.
*G06F 17/00* (2006.01)

(52) U.S. Cl.
USPC .......................................................... 707/695

(58) Field of Classification Search
USPC ........................... 707/812, 695, 690, 999.203
See application file for complete search history.

(56) References Cited

U.S. PATENT DOCUMENTS

| | | | |
|---|---|---|---|
| 5,671,351 A * | 9/1997 | Wild et al. ................. | 714/38.13 |
| 5,715,450 A | 2/1998 | Ambrose et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,549,908 B1 | 4/2003 | Loomans | |
| 6,553,563 B2 | 4/2003 | Ambrose et al. | |
| 6,574,635 B2 | 6/2003 | Stauber et al. | |
| 6,577,726 B1 | 6/2003 | Huang et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,662,312 B1 * | 12/2003 | Keller et al. ................ | 714/38.14 |
| 6,665,648 B2 | 12/2003 | Brodersen et al. | |
| 6,665,655 B1 | 12/2003 | Warner et al. | |

(Continued)

*Primary Examiner* — Mohammed R Uddin
(74) *Attorney, Agent, or Firm* — David Lewis

(57) ABSTRACT

In accordance with embodiments, there are provided mechanisms and methods for automatically updating a software QA test repository in a database system. These mechanisms and methods for automatically updating a QA test repository can enable embodiments to quickly and accurately update a test repository without requiring a user to repeatedly enter test case documentation data. These mechanisms and methods for automatically updating a QA test repository can also enable embodiments to extract plain language descriptions of test cases in the test repository. The ability of embodiments to automatically update the test repository and provide descriptions for the test cases stored in the test repository allows developers to efficiently update and share the contents of the test repository.

51 Claims, 9 Drawing Sheets

(56) References Cited

U.S. PATENT DOCUMENTS

| | | | |
|---|---|---|---|
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,167,870 B2 * | 1/2007 | Avvari et al. | 717/124 |
| 7,516,191 B2 | 4/2009 | Brouk et al. | |
| 7,689,711 B2 | 3/2010 | Brouk et al. | |
| 7,725,605 B2 | 5/2010 | Palmeri et al. | |
| 7,761,410 B2 * | 7/2010 | Hunt et al. | 707/609 |
| 7,788,399 B2 | 8/2010 | Brouk et al. | |
| 8,015,058 B2 | 9/2011 | Fowler et al. | |
| 8,370,809 B2 | 2/2013 | Lawrance et al. | |
| 8,407,205 B2 | 3/2013 | Doshi et al. | |
| 8,417,715 B1 | 4/2013 | Bruckhaus et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0116507 A1 * | 8/2002 | Manjure et al. | 709/229 |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191628 A1 * | 10/2003 | Hickman et al. | 704/9 |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0107415 A1 * | 6/2004 | Melamed et al. | 717/124 |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0229159 A1 * | 10/2005 | Haba et al. | 717/122 |
| 2006/0031225 A1 | 2/2006 | Palmeri | |
| 2006/0235738 A1 * | 10/2006 | Doyle et al. | 705/9 |
| 2007/0022407 A1 * | 1/2007 | Givoni et al. | 717/124 |
| 2007/0079189 A1 * | 4/2007 | Jibbe | 714/724 |
| 2008/0163003 A1 * | 7/2008 | Mehrotra | 714/38 |
| 2009/0217163 A1 * | 8/2009 | Jaroker | 715/700 |
| 2009/0313606 A1 * | 12/2009 | Geppert et al. | 717/124 |
| 2010/0180260 A1 * | 7/2010 | Chikkadevaiah et al. | 717/125 |
| 2010/0235445 A1 | 9/2010 | Palmeri et al. | |
| 2011/0231708 A1 | 9/2011 | Lawrance et al. | |
| 2011/0258225 A1 | 10/2011 | Taylor et al. | |
| 2011/0282847 A1 | 11/2011 | Collins et al. | |
| 2011/0282908 A1 | 11/2011 | Fly et al. | |
| 2011/0283181 A1 | 11/2011 | Waite et al. | |
| 2011/0283267 A1 | 11/2011 | Waite et al. | |
| 2011/0283356 A1 | 11/2011 | Fly et al. | |
| 2011/0289356 A1 | 11/2011 | Hossain et al. | |
| 2011/0289509 A1 | 11/2011 | Kothari et al. | |
| 2011/0295728 A1 | 12/2011 | Bulumulla et al. | |
| 2011/0296386 A1 | 12/2011 | Woollen et al. | |
| 2012/0011077 A1 | 1/2012 | Bhagat | |
| 2012/0011406 A1 | 1/2012 | Williams et al. | |
| 2012/0023107 A1 | 1/2012 | Nachnani et al. | |
| 2012/0030514 A1 | 2/2012 | Lawrance et al. | |
| 2012/0042210 A1 | 2/2012 | Glaser et al. | |
| 2012/0042383 A1 | 2/2012 | Greene et al. | |
| 2012/0042384 A1 | 2/2012 | Badhwar et al. | |
| 2012/0054222 A1 | 3/2012 | Soby | |
| 2012/0054871 A1 | 3/2012 | Soby et al. | |
| 2012/0059919 A1 | 3/2012 | Glaser et al. | |
| 2012/0066755 A1 | 3/2012 | Peddada et al. | |
| 2012/0084638 A1 | 4/2012 | Calvin et al. | |
| 2012/0096521 A1 | 4/2012 | Peddada | |
| 2012/0136602 A1 | 5/2012 | Hossain et al. | |
| 2012/0209947 A1 | 8/2012 | Glaser et al. | |
| 2012/0226784 A1 | 9/2012 | Hepper et al. | |
| 2012/0324125 A1 | 12/2012 | Brouk et al. | |
| 2013/0007062 A1 | 1/2013 | Dutta et al. | |
| 2013/0007523 A1 | 1/2013 | Unger et al. | |
| 2013/0018890 A1 | 1/2013 | Rajan et al. | |
| 2013/0024843 A1 | 1/2013 | Kutlu | |
| 2013/0031496 A1 | 1/2013 | Mathrubootham et al. | |
| 2013/0031613 A1 | 1/2013 | Shanabrook et al. | |
| 2013/0036413 A1 | 2/2013 | Venkatesan et al. | |
| 2013/0042146 A1 | 2/2013 | Unger et al. | |
| 2013/0047090 A1 | 2/2013 | Bhandarkar et al. | |
| 2013/0054792 A1 | 2/2013 | Sharaf | |
| 2013/0055029 A1 | 2/2013 | Lawrance et al. | |
| 2013/0086670 A1 | 4/2013 | Vangpat et al. | |
| 2013/0097713 A1 | 4/2013 | White | |

* cited by examiner

METHOD AND SYSTEM FOR AUTOMATICALLY UPDATING A SOFTWARE QA TEST REPOSITORY

CROSS REFERENCE TO RELATED APPLICATIONS

The following commonly owned, co-pending United States Patents and Patent Applications, including the present application, are related to each other. Each of the other patents/applications are incorporated by reference herein in its entirety:

United States patent application Ser. No. 12/798,187 entitled SYSTEM AND METHOD FOR AUTOMATICALLY UPDATING A SOFTWARE QA TEST REPOSITORY, by Emad Salman et al., filed , Mar. 31, 2010; and

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to quality assurance (QA) testing.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. In conventional software QA testing, software developers conceptualize test plans, create test cases, document test cases and their parameters, and organize and maintain a collection of test cases and execution data. In general, a test case is a set of conditions, steps, expected outcomes used for testing features or functionality of software applications, and results of the testing (if available). In order to effectively manage all the collected test cases and test case data, access the test cases and test case data when needed, and effectively communicate details about the test cases with other technical and non-technical individuals, it is important to have the test cases and test case data properly sorted, organized, and documented into a logical database. This requires the software developer to properly input, store, and track test case documentation and execution data each time a test case is run.

Unfortunately, entering and documenting large amounts of test case data is time consuming and error prone. As test cases are created and test case execution data is collected to be stored in a QA test case repository, it needs to be categorized and documented so that it can be quickly looked up and accessed at a later time. It becomes particularly cumbersome when employing fast paced Scrum development methodology, since the methodology encourages small iterative development life cycles and test driven development. This requires software developers to perform redundant data entry which is inefficient and leads to data entry errors. Developers want to be able to quickly and accurately document test cases and update the test case repository to reflect new additions and improvements.

Accordingly, it is desirable to provide an automated method and system for updating a software QA test case repository in a database system in a manner that reduces errors and improves the efficiency of updating the QA test case repository.

BRIEF SUMMARY

In accordance with embodiments, there are provided mechanisms and methods for automatically updating a software QA test case repository. These mechanisms and methods for automatically updating a software QA test case repository in a database system can enable embodiments to automatically upload and update test cases and test case execution data to a QA test case repository. The ability of embodiments to automatically upload test cases and test case execution data to a QA test case repository in a database system tends to enable users to document test cases more quickly and accurately than manually updating the test case repository.

In an embodiment and by way of example, a method for automatically uploading and updating test cases and test case execution data to a QA test case repository in a database system is provided. In an embodiment, a request to automatically upload and update test case data to a QA test case repository is received by a test repository automatic update tool. After the test case is executed, in response to the request to upload and update test case data, the automatic update tool accesses the test case and execution data. In an embodiment, the automatic update tool extracts test case information. In an embodiment, based on the extracted information, the automatic update tool determines the appropriate hierarchy level for the test case and execution data, and updates the test case repository (e.g., by uploading the test case data to the appropriate hierarchy level).

While the present invention is described with reference to an embodiment in which techniques for automatically updating a software QA test case repository are implemented in a system having an application server providing a front end for an on-demand database service capable of supporting multiple tenants, the present invention is not limited to multi-tenant databases nor deployment on application servers. Embodiments may be practiced using other database architectures, e.g., ORACLE®, DB2® by IBM and the like, or other architectures, such as Windows® or Unix® without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

General Overview

Systems and methods are provided for automatically updating a QA test case repository.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

The following begins with a system overview describing the components of a system for automatically updating a software QA test case repository in an on-demand service. Then, mechanisms and methods for automatically updating a software QA test case repository in an on-demand service will be described with reference to example embodiments.

System Overview

Figure 1:
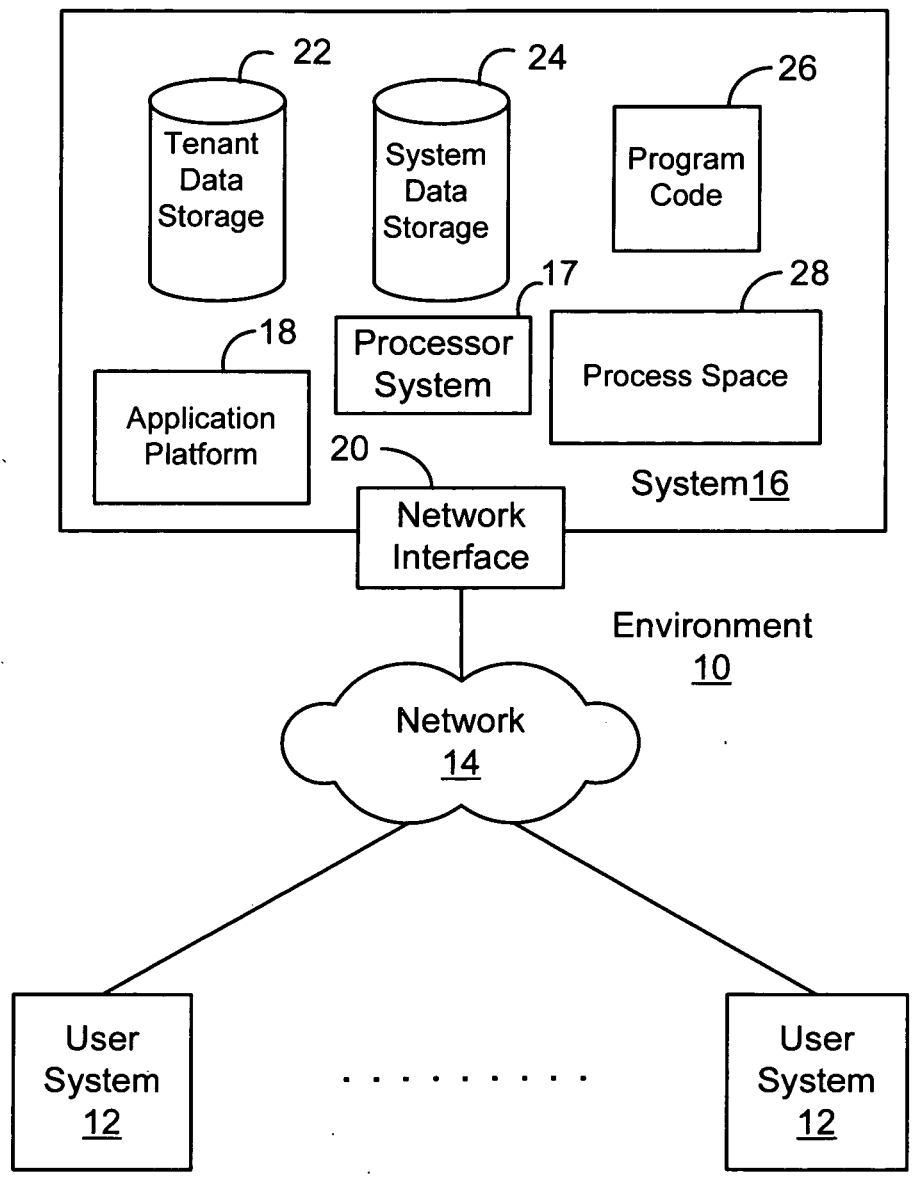
FIG. 1 illustrates a block diagram of an example of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment including a system of one or more machines in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a pre-established database system (a system of one or more machines running a database server) that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image (on one or more machine readable media within one or more storage devices and/or other machines) to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, management and execution of one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well and/or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database, object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation and storage of the applications into one or more database objects and manages execution of the applications in a virtual machine in the process space of one more of machines of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application (s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
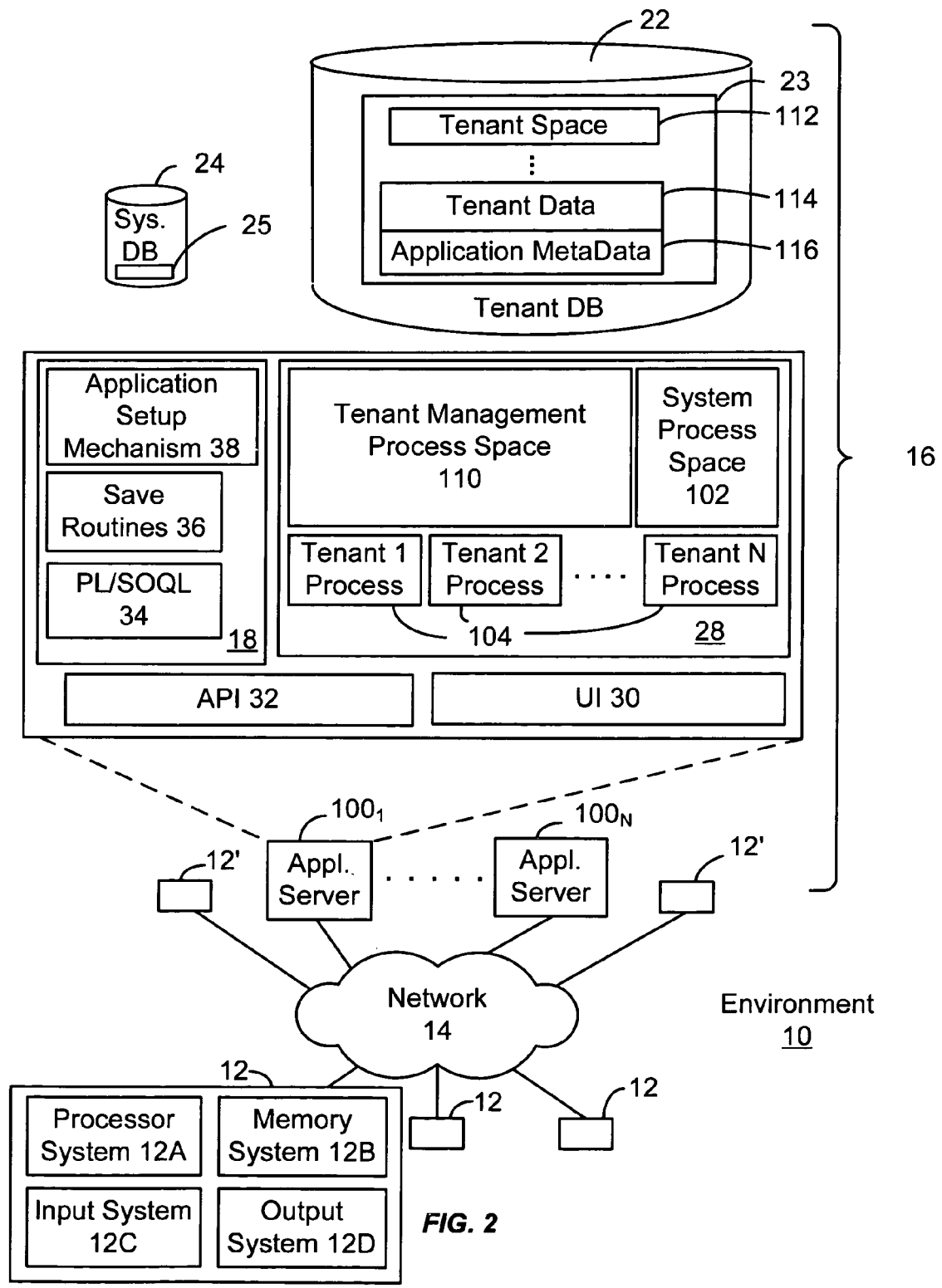
FIG. 2 illustrates another block diagram of an example of the environment of FIG. 1.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. Additionally, FIG. 2 includes additional user systems 12'. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. User systems 12' may be any in-house machine or system in relation to the on-demand database service, that is used by a user to access a database user system. An in-house machine or system may be physically located on-site and/or otherwise associated with the on-demand database service. As illustrated in FIG. 2, user systems 12' might interact via a network 14 with an on-demand database service, which is system 16. In an embodiment, user systems 12' may interact directly with an on-demand database service without benefit of network 14. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12 and 12'. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12 and 12'. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned U.S. Provisional Patent Application 60/828, 192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 and 12' to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multitenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Similar to user systems 12, in certain embodiments, user systems 12' (which may be in-house client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

System Process Space

Figure 3A:
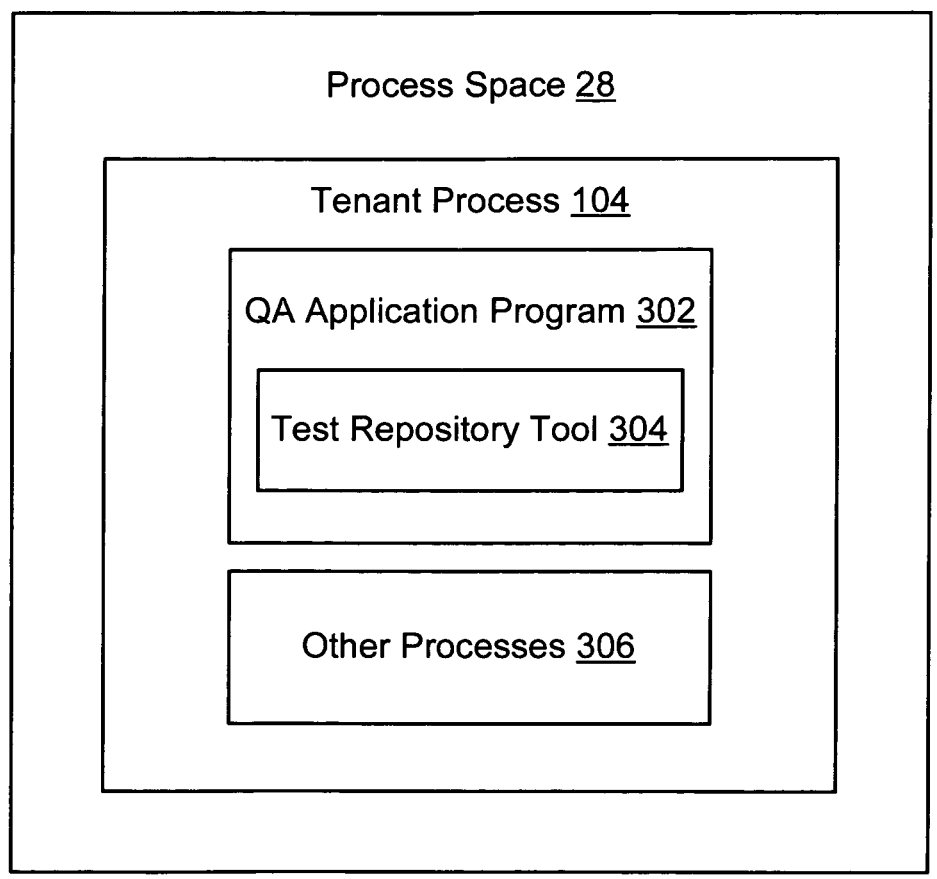
FIG. 3A shows a block diagram of an embodiment of process space 28 of FIG. 2.

FIG. 3A shows a block diagram of an embodiment of a tenant process 104 in process space 28. Tenant process 104 may include QA application 302 with test repository tool 304. Tenant process space 104 may further include other processes 306. In other embodiments, tenant process space 104, may not have all of the elements listed and/or may have other elements instead of or in addition to those listed.

QA application 302 is an application that allows software developers to track, place and store test cases in a QA test case repository. In one implementation, QA application 302 tracks both manual and automated test cases in the QA test case repository. A QA test case repository may be a database or a portion of a database containing previously run test cases, test case parameters, test case execution data, and/or descriptions of the test cases, according to one embodiment. A QA test case repository allows developers, development teams, and subsequent developers, to find, reference, and/or reuse test cases. QA application 302 may be used to track, place, and store test cases created to fix software bugs or test new features or functionality (which, for example, may have been added in response to user requests) in the QA test case repository. In an embodiment, QA application 302 may have a feature that allows developers to track the percentage of manual test cases versus automated test cases. By being able to track the percentage of manual test cases and automated test cases, developers can identify areas vulnerable to regression as a result of code changes. Regression is when errors and bugs believed to have been fixed in prior revisions reoccur after further code changes. QA application 302 may invoke or be incorporated within the database application (e.g., the OODBMS or RDBMS).

Test repository tool 304 (of QA application 302) allows developers to establish and view a hierarchy of test cases and execution data stored in a database. For example, a developer may create a new test case for testing whether electronic mail alerts are being sent when new electronic mail is received. In an embodiment, the developer may use test repository tool 304 to view the hierarchy of the QA test case repository to determine where to store the newly created electronic mail alert test case. For example, using test repository tool 304 the developer may store the electronic mail alert test case in a hierarchy level containing test cases related to electronic mail functionality. The QA test repository hierarchy allows developers to organize test cases and execution data so that the test cases can be quickly accessed and referenced whenever needed. In an embodiment, the hierarchy may be organized in a manner that facilitates the rapid updating, uploading, inserting, and/or accessing of test cases. For example, the hierarchy may group together test cases by creation date, execution date, upload date, functionality, etc. In an embodiment, test repository tool 304 may display to the user descriptive information about the test case in plain language. The plain language description may allow developers and non-technical individuals to quickly assess the intent, status and outcome of stored test cases. Additionally, test repository tool 304 may be used to alter and edit the hierarchy of the QA test case repository. For example, when creating or editing test cases, the user may be presented with a number of fields where a pre-existing hierarchy level may be selected, a pre-existing hierarchy level may be modified or edited, or a new hierarchy level may be created which better suits the test case. Alternatively, the user may select or be presented with a drop down menu allowing the user to modify, edit, or create hierarchy levels. Other processes 306 may contain other tenant processes, for example processes for enabling other tenant features and functionality. In other embodiments, any combination of the elements of FIG. 3A may be located in other parts of system 16 instead of process space 28.

Figure 3B:
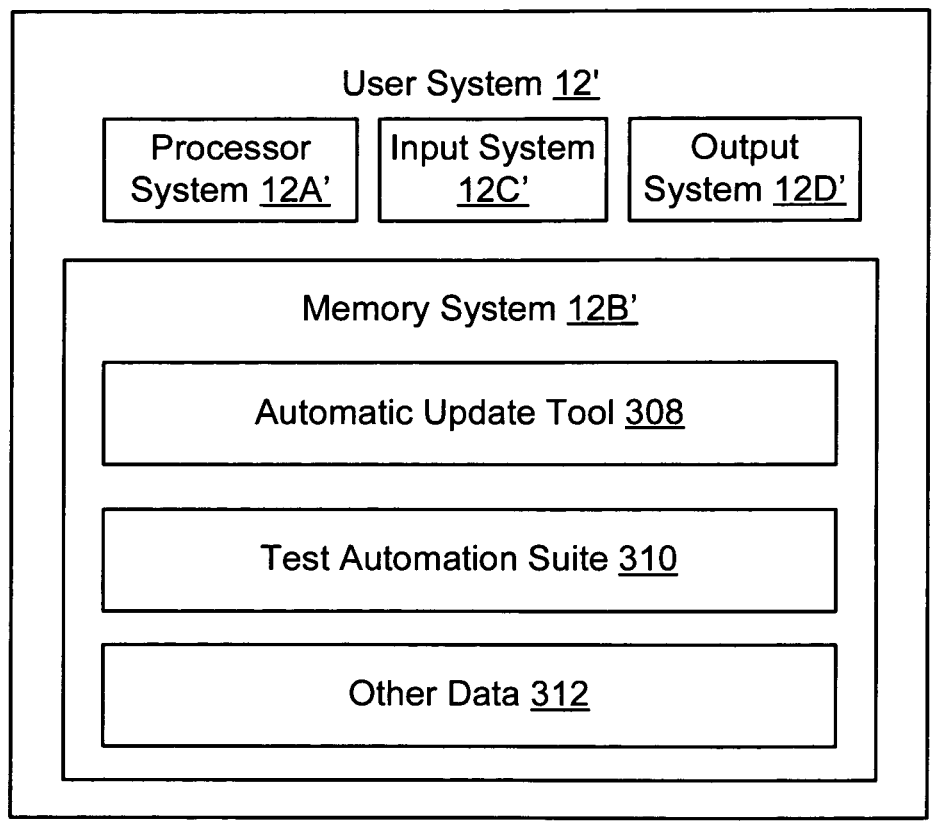
FIG. 3B shows a block diagram of an embodiment of systems 12' of FIG. 2.

FIG. 3B shows a block diagram of an embodiment of an in-house user system 12'. Similar to user system 12, the processor system of 12A' may be any combination of one or more processors. Memory system 12B' may be any combination of one or more memory devices, short term, and/or long term memory. Input system 12C' may be any combination of input devices, such as one or more keyboards, mice, trackballs, scanners, cameras, and/or interfaces to networks. Output system 12D' may be any combination of output devices, such as one or more monitors, printers, and/or interfaces to networks. Memory system 12B' may include automatic update tool 308 and test automation suite 310. Memory system 12B' may further include other data 312. In other embodiments, user system 12B' may not have all of the elements listed and/or may have other elements instead of or in addition to those listed.

Automatic update tool 308 is a tool that automatically places test cases and test case execution data into the QA test case repository, preferably, at the proper hierarchy level. For example, the test case for the electronic mail alert example described above may be subjected to automated testing, resulting in numerous test executions. In one implementation, invoking automatic update tool 308 before executing the automated testing results in the automatic "upserting" of the test case and associated execution data to the test repository. Performing an "upsert" involves inserting the test case and its execution data into the QA test case repository. Upserting can be done when a prior version of the test case does not exist in the repository. Alternatively, upserting can update execution data when a prior test case version already exists in the repository. In an embodiment, updating the execution data when a prior test case version and/or execution already exists does not overwrite previous execution data. In an embodiment, when a test case version and/or execution data already exists, new data is added to the file and/or record containing the previous data. In another embodiment, a new file and/or subfolder is added to the folder or record for the test case. In one implementation, automatic update tool 308 may be used to upload and update the test case execution data at any time before or after executing automated testing. Note that while automatic update tool 308 is described as placing, updating, and uploading the test case to the QA test repository, automatic update tool 308 sends a request to initiate the placing, updating, and uploading. In response to the request, QA application 302 automatically handles the test repository action request.

In an embodiment, automatic update tool 308 may be invoked via a control on a webpage. For example, the user may be presented with a webpage that allows the user to select the use of automatic update tool 308 via a checkbox or button that is located on the webpage. Alternatively, automatic update tool 308 may be invoked via a command line. For example, the user may access a command line and type in the commands necessary to invoke automatic update tool 308. In an embodiment, the user may be given a choice whether to invoke automatic update tool 308 via webpage or a command line.

In one implementation, automatic update tool 308 simplifies the test case uploading and updating process because it provides the capability to automatically extract test case attributes from the test cases. The test case attributes can facilitate automatically updating and/or uploading to the proper test case repository hierarchy level. In an embodiment, automatic update tool 308 may need only a single test case attribute, such as the hierarchy level attribute, to update and upload the test case data to the QA test case repository. However, with only a hierarchy level attribute, the descriptive information stored with the test case in the test case repository might be less informative to subsequent users. In an embodiment, automatic update tool 308 may use a relatively small number of attributes (e.g., just 4 test case attributes) to update and upload to the QA test case repository. For example, the test case attributes used may include subject, description, associated user story and hierarchy level. A user story is a software requirement captured in common vernacular (e.g., "plain English" or natural language) usually in the form of a sentence. In an embodiment, automatic update tool 308 gives test authors the ability to reuse common attributes shared by tests within the same class instead of having to re-enter the information. For example, a new test case which is a modified version of an older test case may inherit the attributes of the older test case without the need for the test author to specify the attributes. In an embodiment, the extracted attributes are used by automatic update tool 308 to generate a unique ID, which is used as a unique external key to update and upload to the QA test repository. In an embodiment, the extracted user story is sent to QA application 302, which returns a unique ID associated with the user story which is used to update and upload to the QA test repository. In an embodiment, the descriptive information displayed by test repository tool 304 may include the test case subject, description, associated user story, and hierarchy level. In alternative embodiments, other attributes may be used. Note that the term attribute as used in this application is generic to both a database key and its ordinary dictionary definition, which would include a feature and/or characteristic of a test case.

To illustrate how attributes are used, consider the example attributes mentioned above (e.g. subject, description, associated user story, and hierarchy level attributes). The subject of the test case can be a brief one-sentence representation of the test case. For example, the subject for the electronic mail alert described previously might be "Test For Electronic Mail Alert" or "Electronic Mail Alert Notification Test." The description of the test case may be a detailed plain language explanation of the purpose and functionality of the test case. For example, the plain language description of the electronic mail alert test case may be "Create list1 of users that should receive email alert, create list2 of users that should not receive email alert. Run useralert routine to identify which users are to receive email alert. Run sendalert routine to send alert to list1 users. Verify whether email alert was successfully sent to list1 users. Verify email alert was not sent to list2 users." In an embodiment, test repository tool 304 displays the subject and description of the test case such that developers and non-technical individuals can quickly determine the essence of the test case. The user story was briefly explained above (as a reminder, user story is a software requirement described in common vernacular). An example of a user story may be, "As an electronic mail user I want to receive email alerts when there is new mail so that I can be more responsive to customers needs." The user story of the test case refers to a user story name or user story ID. Each user story is given a unique user story name or user story ID to uniquely identify it from other user stories. For example, the user story name for the electronic mail alert test case may be "Contacts: Email Alert". In an embodiment, a user story ID may be in the form of a 15-character ID or an 18-character ID, for example, a01T00000033iZrIAI. In an alternative implementations, the user story ID may be generated in a different way. The test case hierarchy level designates where the test case is to be updated and/or uploaded to within the test case repository. In an embodiment, the hierarchy used in the test case repository may include a classification system having several classes and each class may have several subclasses. Optionally, the subclasses may be divided into further subclasses of sub-classes. In an embodiment, the name of the class may be followed by a dot (or another predetermined character) followed by the name of the subclass and/or test case. Optionally, each level or further sub-classification may be separated from the class/subclass below/test case by a dot. For example, in a two level hierarchy, in which the email alert test case is contained in the class "Contacts", the hierarchy level for the email alert test case might be in the form "Contacts.Email Alerts" or in a three level hierarchy in which contacts is a subclass of the class "Communications" might be "Communications.Contacts.Email Alerts."

Automatic update tool 308 may extract the necessary attributes for uploading and updating the QA test repository from a number of different sources. For example, automatic update tool 308 may extract the attributes from a comment, the comment being text within a portion of the test source code that is ignored by a compiler. A comment is inserted by the developer and can be used to explain and describe the source code, the intent of the developer, what the source code attempts to accomplish, and/or for general documentation purposes. In an embodiment, automatic update tool 308 may extract the attributes from a comment contained at the test method level or the class level (the class level in which the test method is defined or any higher hierarchical class the test method belongs to, because of inheritance), or both. For example, if the test case is implemented as a JAVA class, automatic update tool 308 may extract the attributes from a class level JavaDoc comment. The comment is distinguished from the source code by a delimiter, which can vary depending upon the programming language used. For example, some programming languages may use "/*", "!", or "#" as a delimiter. The following illustrates a JavaDoc comment beginning with a begin comment delimiter /** and ending with delimiter */.

```
/**
*Test for new electronic mail alert. Test determines whether the user
*notification flag is set when new email is received.
*@hierarchy Contacts.New Email Alerts
*@userStory a01T00000033iZrIAI
*/
```

In an embodiment, automatic update tool 308 extracts the subject of the test case from the comment. For example, in the JavaDoc comment above, the first sentence "Test for new electronic mail alert" is extracted by automatic update tool 308 and becomes the subject of the test case. In an embodiment, automatic update tool 308 may also extract the test case description from the comment. For example, in the JavaDoc comment above, the second sentence is distinguished by a sentence break in the form of a period and is extracted as the test case description. In other embodiments, other characters or markers are used to distinguish between different attributes, such as line breaks, semicolons, and/or commas. The distinguishing of the second sentence results in an extracted test case description of "Test determines whether the user notification flag is set when new email is received." In an embodiment, if the first sentence extracted for the test case subject (or another attribute such as the case description) is longer than a preset character allotment, the subject will be truncated at the end of the last word that fits within the preset character allotment. In one implementation, subsequent words and sentences get prefixed to the test case description.

In an embodiment, automatic update tool 308 extracts the user story and hierarchy level from the comment by using identifying tags. A tag is an indicator that identifies to automatic update tool 308 what immediately follows is to be extracted. A tag also informs the developer what the immediately following value represents. In an embodiment, a tag may be indicated by using the @ symbol followed by a descriptive name of the value to be extracted. For example, in the JavaDoc comment above, the tags @userstory and @hierarchy precede the user story and hierarchy data values extracted by automatic update tool 308. In an alternative embodiment, a tag may be indicated by using the @ symbol and a non-descriptive name. For example, @nondescriptive1 or @anything could be used as tags. In an embodiment, tags may be indicated by using any designated convention for denoting a tag. For example, {Tag1}, [USERSTORY], +anothertag+, &userstory, <attributetag>, etc., may all be designated conventions for denoting a tag.

Automatic update tool 308 may also extract attributes from test automation suite 310 and/or a test inventory file. Test automation suite 310 is an application containing scripts for executing test cases. In an embodiment, test automation suite 310 allows the developer to use the scripts to execute automated test cases to determine whether the test cases function as expected. Depending on whether the automated test case executions result in expected outcomes, the test cases may pass or fail. The use of the scripts of test automation suite 310 allows the developer to automatically execute test cases multiple times. In an embodiment, test automation suite 310 may contain a test inventory file. The test inventory file is a file containing a catalog of test classes used by test automation suite 310 to run tests for new features or functionality. In an embodiment, a test class may have one or more test methods, and each test method maps to one or more test cases in the repository. In an embodiment, there is a one to one correspondence of test method to test case, which may simplify troubleshooting. For example, if one test method maps to ten test cases, it may take longer to diagnose and/or correct a problem as compared to a test method mapping to one test case, as the test methods become large and complex. In an embodiment, all fields that are permitted in class level test case documentation are permissible in the test inventory file. For example, the catalog of test classes in the inventory file may contain the hierarchy level and user story attributes used for updating and uploading the test case to the QA test repository. In an embodiment, automatic update tool 308 gives precedence to attributes extracted closest to the test method. Attributes which are closer or local to the test method are more relevant and given a higher priority than other attributes. For example, if the necessary attributes for uploading are provided at the test method level, then attributes provided at the class level and/or inventory level may be ignored.

If any attributes required by automatic update tool 308 to update and upload to the test repository are missing from either the test cases, the test automation suite 310, or the test inventory file, automatic upload tool 308 may extract the missing attributes from any combination of the test case, test automation suite 310, and/or the test inventory file. For example, in an embodiment, if the test inventory file does not contain the hierarchy level or user story attributes, the hierarchy level or user story attributes may be accessible in either a class level or a method level comment for automatic upload tool 308 to extract. Otherwise, in some implementations, the upload to the test repository may fail. In an embodiment, automatic upload tool 308 first extracts attributes from the test inventory file, then extracts the attributes at the class level, and then extracts attributes at the test method level. In an embodiment, attributes that are closer and/or local to the test method are more relevant than attributes provided at common and/or higher levels. For example, if attributes for all fields are provided at the test method level, everything at the class or inventory level will be ignored. Attributes contained at more then one level are extracted and stored with the values extracted closest to the test method level. In an embodiment, if an attribute required for automatic upload tool 308 is missing, automatic upload tool 308 may prompt the user for missing attributes. Upon receiving the missing attributes automatic upload tool 308 may then continue updating and uploading to the QA test repository. In an embodiment, automatic upload tool 308 tracks the results of the upload process in an output file, which can be used to identify data issues that may have resulted in validation failures (for example, referencing a non-existent user story, missing required data).

Automatic update tool 308 may optionally extract additional data identified by tags but which are not necessary to update and upload to the QA test repository. For example, automatic update tool 308 might optionally extract test case priority, test case owner, test case assignee, expected results, etc. The additional optional data gives developers that subsequently access the test repository a more complete understanding of the test case. In an embodiment, automatic upload tool 308 may extract attributes used to update and upload to a QA test repository from test cases documented using JAVA annotations. In an alternative embodiment, automatic upload tool 308 may extract attributes used to update and upload to the test repository from test cases documented in other software languages. In an alternative embodiment, test repository tool 304 and automatic update tool 308 may be different functions of the same tool.

Memory system 12B' of user system 12' may also include test automation suite 310. As described previously, test automation suite 310 allows the developer to test new automated test cases to determine whether the test cases function as expected. In an alternative embodiment, test automation suite 310 may include automatic update tool 308. In an alternative embodiment, automatic update tool 308 may include test automation suite 310. Other data 312 may contain other software programs for performing other QA functions, for example running and executing test cases manually. In other embodiments, any of combination of the elements of FIG. 3 may be located in other parts of system 16 instead of process space 28.

Tenant Data Storage

Figure 4:
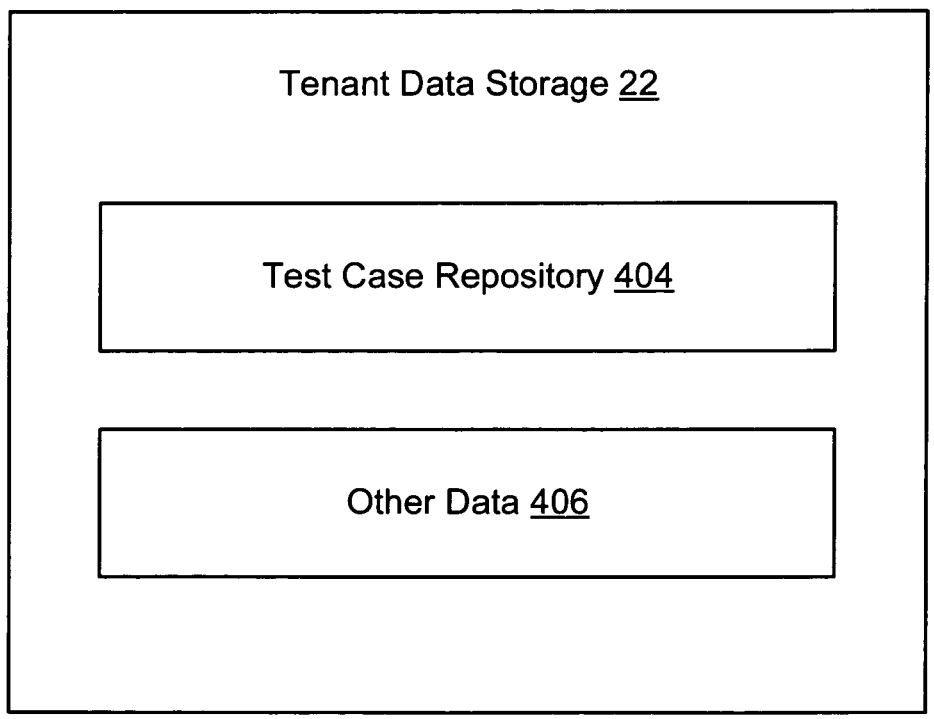
FIG. 4 shows a block diagram of an embodiment of the tenant data storage of FIG. 1.

FIG. 4 shows a block diagram of an embodiment of tenant data storage 22. Tenant data storage 22 may include test case repository 404. Tenant data storage 22 may also include other data 406. In other embodiments, tenant data storage 22 may not have all of the elements listed and/or may have other elements instead of or in addition to those listed.

Tenant data storage 22 was described in FIGS. 1 and 2. Tenant data storage 22 may also store different types of related tenant data. For example, other tenant application data and other tenant application execution data may be stored in tenant data storage 22. Test case repository 404 is a collection that includes prior test cases that have been already previously run, test case documentation, and test execution data. For example, test case repository 404 may contain the electronic mail alert test case described above after having been automatically executed with test automation suite 310. Test case repository 404 may also contain the documentation associated with the test case such as description of the test case, input, output, associated user story, hierarchy level, expected results, revision number, date created, owner, etc., and whether the test passed or failed. Other data 406 may include any other data saved on system 16. For example, standard and custom user or third party applications, which may include CRM, may be stored in other data 406.

System Side Method for Automatically Updating QA Test Case Repository

Figure 5:
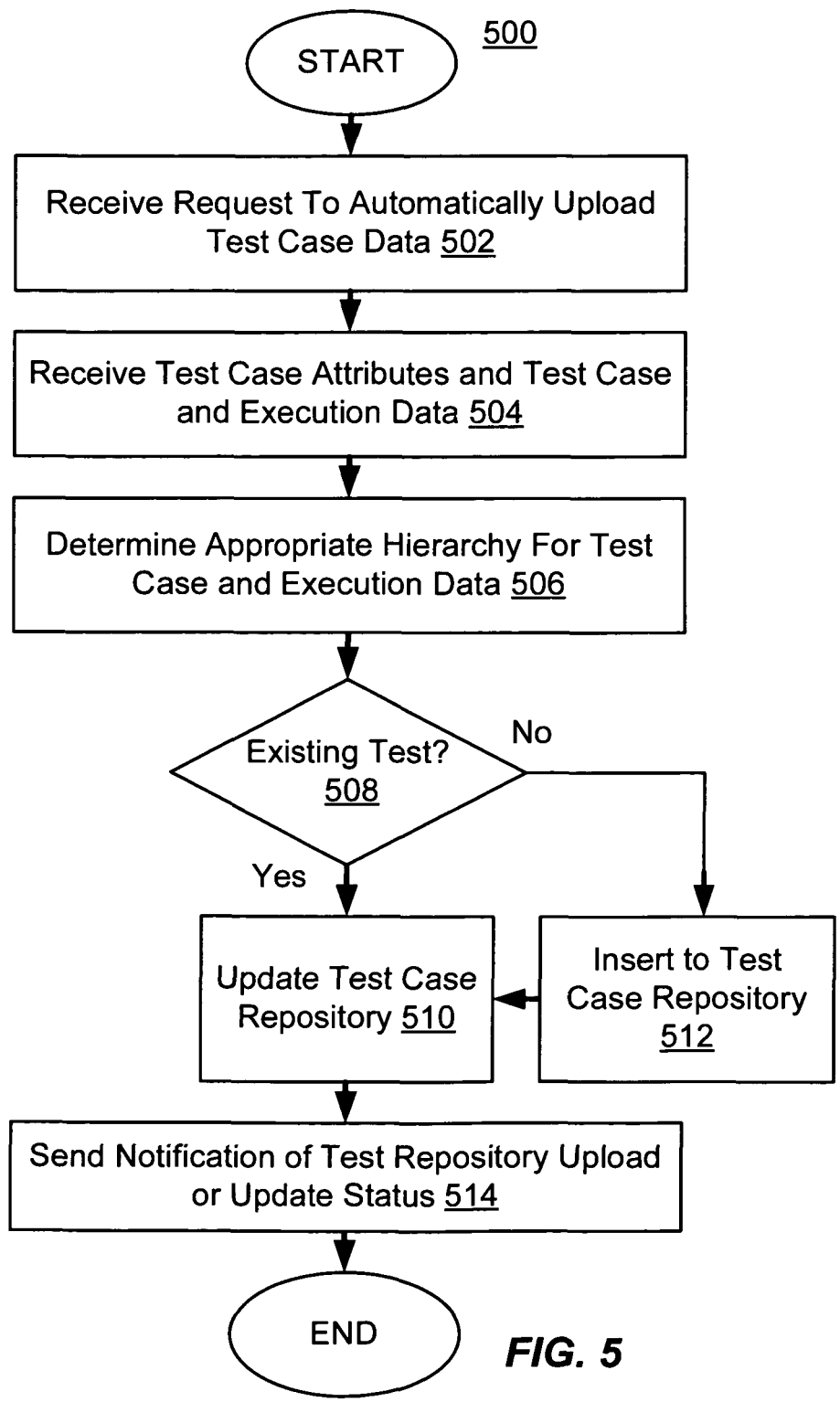
FIG. 5 shows a flowchart of an embodiment of a system side method for automatically inserting to and updating a QA test case repository.

FIG. 5 shows a flowchart of an embodiment of a system side method for automatically updating and uploading to a test case repository. In step 502, QA application 302 may receive a request to automatically update and upload test case data to the test case repository. For example, QA application 302 may receive a request to automatically update and upload to the test case repository from a user system.

In step 504, QA application 302 may receive test case attributes and test case and execution data from a user system.

In step 506, QA application 302 determines the appropriate place in the QA test repository for the test case and execution data, for example, where in the hierarchy the test case and execution data should be stored. In an embodiment, the extracted test case hierarchy data received by QA application 302 may be used to find the appropriate class and subclass where the test case belongs. For example, in order to place a test case having a hierarchy level Communications.Contacts.New Email Alerts into a hierarchy having three levels, QA application 302 first searches for the class Communications. After finding the Communications class, QA application 302 then searches for subclass Contacts within the class Communications. After finding the Contacts subclass, QA application 302 places New Email Alerts into subclass Contacts within class Communications. In an embodiment, automatic update tool 308 may use the generated unique external key to update and upload to the test repository.

In step 508, QA application 302 determines whether previous test case executions of the test case being updated and uploaded, exist in the QA test case repository. If previous test executions of the test case being updated and/or uploaded do exist, step 510 is performed. If previous test executions of the test case being updated or uploaded do not exist, step 510 is skipped and step 512 is performed.

In step 510, prior test executions of the test case being updated and uploaded exist, and the QA test repository is update with the latest test case version and execution data.

In step 512, prior test executions of the test being updated and uploaded do not exist, and the test case and execution data are inserted into the QA test repository.

In step 514, notification is sent to the user system indicating the status of the uploading and updating of the test case and associated execution data to the QA test repository.

In an embodiment, each of the steps of method 500 is a distinct step. In another embodiment, although depicted as distinct steps in FIG. 5, steps 502-514 may not be distinct steps. In other embodiments, method 500 may not have all of the above steps and/or may have other steps in addition to, or instead of, those listed above. The steps of method 500 may be performed in another order. Subsets of the steps listed above as part of method 500 may be used to form their own method.

User Side Method for Automatically Updating QA Test Case Repository

Figure 6:
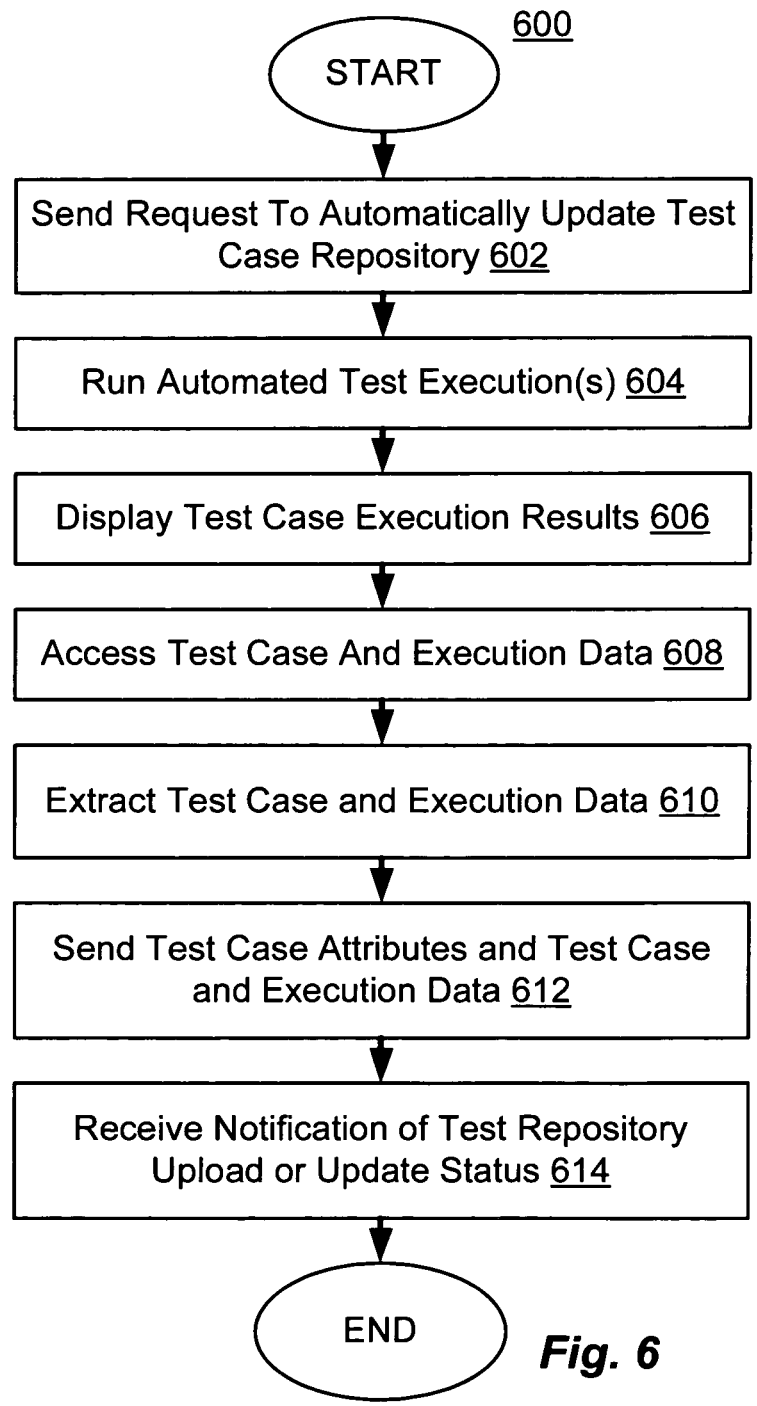
FIG. 6 shows a flowchart of an embodiment of a user side method for automatically inserting to and updating a QA test case repository.

FIG. 6 shows a flowchart of an embodiment of a user side method for automatically updating and uploading to a test case repository. In step 602, the user sends a request to automatically update and upload to the QA test case repository. For example, the user may send the request by indicating on a webpage checkbox or button selection, the use of automatic update tool 308.

In step 604, the user runs the automated scripts stored in test automation suite 310 that executes the test case which is to be uploaded to or updated in the QA test case repository. In step 606, the user is notified of the progress or result of the test case execution(s).

In step 608, automatic upload tool 308 accesses the automated test case, test automation suite 310, the inventory file for test automation suite 310, or any combination of sources required to extract the test case attributes needed to update and upload to the test case repository.

In step 610, automatic upload tool 308 extracts the test case attributes necessary to update and upload to the test case repository. As explained above, automatic upload tool 308 may extract the attributes from any combination of the test case, the test automation suite, or the test automation inventory file. The attributes extracted may include subject, description, user story, and hierarchy.

In step 612, the extracted test case attributes, test case, and associated execution data are sent to the QA test case repository for uploading and updating. In step 614, the user system is notified of the results of the upload and update process to the QA test case repository.

In an embodiment, each of the steps of method 600 is a distinct step. In another embodiment, although depicted as distinct steps in FIG. 5, steps 602-614 may not be distinct steps. In other embodiments, method 600 may not have all of the above steps and/or may have other steps in addition to, or instead of, those listed above. The steps of method 600 may be performed in another order. Subsets of the steps listed above as part of method 600 may be used to form their own method.

Method for Using the Environment (FIGS. 1 and 2)

Figure 7:
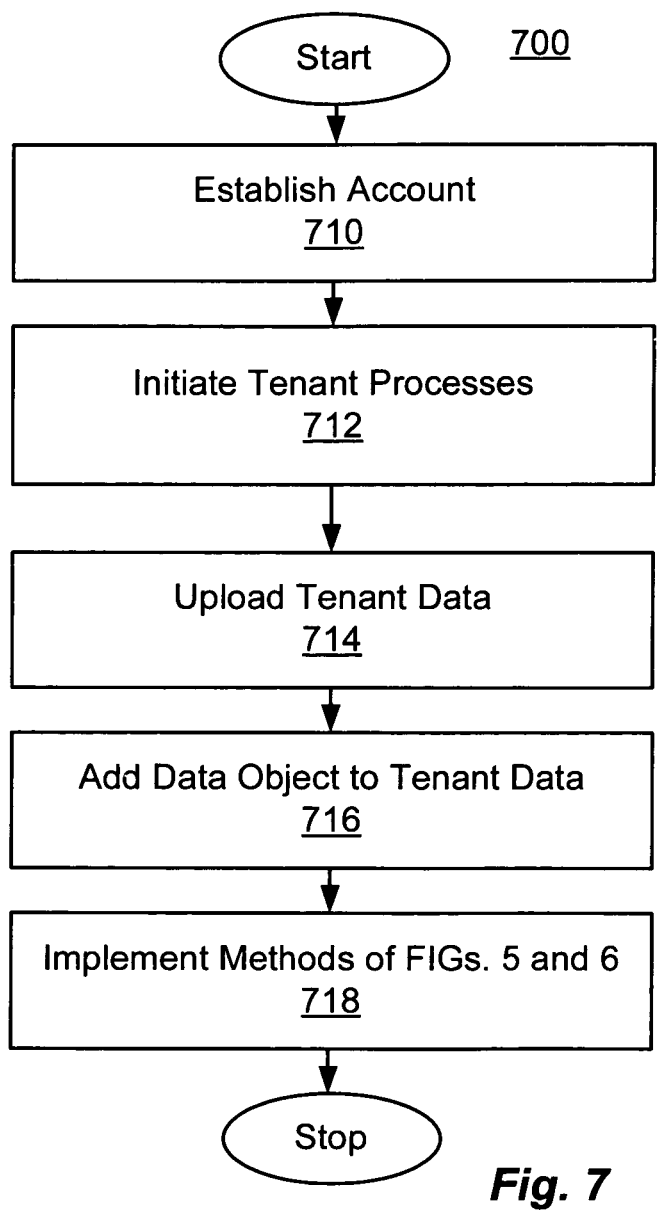
FIG. 7 shows a flowchart of an example of a method of using the environment of FIGS. 1 and 2.

FIG. 7 shows a flowchart of an example of a method 700 of using environment 10. In step 710, user system 12 (FIGS. 1 and 2) establishes an account. In step 712, one or more tenant process space 104 (FIG. 2) are initiated on behalf of user system 12, which may also involve setting aside space in tenant space 112 (FIG. 2) and tenant data 114 (FIG. 2) for user system 12. Step 712 may also involve modifying application metadata to accommodate user system 12. In step 714, user system 12 uploads data. In step 716, one or more data objects are added to tenant data 114 where the data uploaded is stored. In step 718, the methods associated with FIG. 5 and FIG. 6 may be implemented. For example, in step 718, QA application 302, may receive a request to automatically upload and update the QA test repository via a webpage checkbox or button selecting the use of automatic update tool 308. In response to the request, automatic update tool 308 may access and extract test case attributes used for inserting and/or updating to the QA test repository from the test case, automation suite 310, or the test inventory file. Automatic update tool 308 may then determine the appropriate hierarchy for the extracted test case and execution data based on the extracted attributes, and insert and/or update the test case and execution data into the QA test case repository. In another embodiment, although depicted as distinct steps in FIG. 7, steps 702-718 may not be distinct steps. In other embodiments, method 700 may not have all of the above steps and/or may have other steps in addition to, or instead of, those listed above. The steps of method 700 may be performed in another order. Subsets of the steps listed above as part of method 700 may be used to form their own method.

Method for Creating the Environment (FIGS. 1 and 2)

Figure 8:
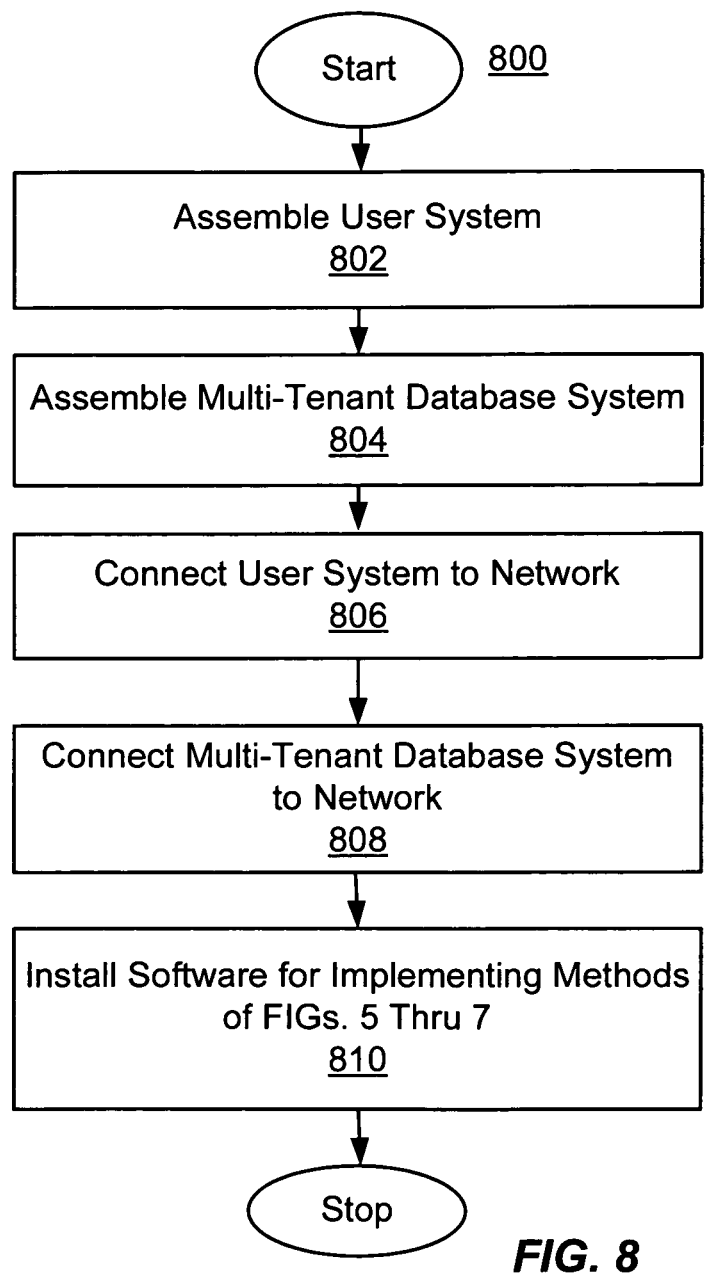
FIG. 8 shows a flowchart of an example of a method of making the environment of FIGS. 1 and 2.

FIG. 8 is a method of making environment 10, in step 802, user system 12 (FIGS. 1 and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 804, system 16 (FIGS. 1 and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 16 may include installing application platform 18, network interface 20, tenant data storage 22, system data storage 24, system data 25, program code 26, process space 28, UI 30, API 32, PL/SOQL 34, save routine 36, application setup mechanism 38, applications servers 100$_1$-100$_N$, system process space 102, tenant process spaces 104, tenant management process space 110, tenant space 112, tenant data 114, and application metadata 116 (FIG. 2).

In step 806, user system 12 is communicatively coupled to network 104. In step 808, system 16 is communicatively coupled to network 104 allowing user system 12 and system 16 to communicate with one another (FIG. 2). In step 810, one or more instructions may be installed in system 16 (e.g., the instructions may be installed on one or more machine readable media, such as computer readable media, therein) and/or system 16 is otherwise configured for performing the steps of methods associated with FIG. 5 and FIG. 6. For example, QA application 302 may be installed in program space 26 of system 16. In an embodiment, each of the steps of method 800 is a distinct step. In another embodiment, although depicted as distinct steps in FIG. 8, steps 802-810 may not be distinct steps. In other embodiments, method 800 may not have all of the above steps and/or may have other steps in addition to, or instead of, those listed above. The steps of method 800 may be performed in another order. Subsets of the steps listed above as part of method 800 may be used to form their own method.

Extensions and Alternatives

In an alternative embodiment, updating the QA test case repository may be performed based on any combination of subject, description, associated user story, and/or hierarchy level. For example, the update may be performed based on just the subject and the associated user story or based just on the hierarchy level.

In an alternative embodiment, tags are used to identify all of the attributes necessary for updating and uploading to the test repository. For example, instead of designating the first sentence as the subject of the test case and the second sentence as the description of the test case, automatic upload tool 308 extracts the subject and description after encountering the @subject and @description tags.

In an alternative embodiment, automatic upload tool 308 may extract attributes used to update and upload to the QA test case repository from multiple comments contained within the same test case. For example, automatic upload tool 308 may combine multiple comments (which may be located in a variety of places) within the test case to create a test case description.

In an alternative embodiment, automatic upload tool 308 may be located on application server 100. In an alternative embodiment, automatic upload tool 308 may be located in tenant process space 28 and/or tenant process 104.

Each embodiment disclosed herein may be used or otherwise combined with any of the other embodiments disclosed. Any element of any embodiment may be used in any embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for automatically updating a test case repository, the method comprising:
    receiving at a machine resident host system, a request from a user machine for automatically updating the test case repository, the machine resident host having a processor, a memory system, and at least one or more machine readable media;
    wherein the test case repository resides on one or more locations on the at least one machine readable media;
    wherein the test case repository stores one or more test case versions with associated prior test case execution data, each test case having a location within a predetermined organization of test cases in test the case repository;
    associating, at the machine resident host system, a test case including information extracted about software tested, with test case execution data, text from which the information is extracted being located in a text file having source code of the software tested; and
    automatically, updating, at the machine resident host system, the test case repository in the memory system with the test case based on the information extracted about the software tested;
    wherein the information about the software tested is extracted from at least content within a source code file;
    wherein extracted information about the software include at least
        a location within the predetermined organization of test cases within the repository to associate with the test case, and
        a description of information about the software, associated with the test case; and
    wherein the test case repository is in an on-demand service in a machine resident host system for a multi-tenant database system.

2. The method of claim 1, wherein the extracted information about the software tested are features of the test case which determine where the test case is stored in the QA test case repository.

3. The method of claim 1, the method further comprising:
    receiving at the machine resident host system, a request from the user machine to view the contents of the QA test case repository; and
    displaying a view of the QA test repository that includes a plain language description of stored test cases in response to the request.

4. The method of claim 1, the method further comprising:
    if a prior version of the test case does not exist in the test repository,
    inserting the test case into the test case repository at a hierarchy level suitable for the test case; and
    uploading a set of execution data associated with the test case.

5. The method of claim 1, the method further comprising:
    if a prior version of the test case already exists in the test repository, updating a prior test case version with a latest test case version; and
    uploading a set of execution data associated with the latest test case.

6. The method of claim 1, wherein the information about the software tested is extracted from at least one comment in a source code file, the comment being text within a portion of the source code that is ignored by a compiler.

7. The method of claim 1, wherein the information about the software tested is extracted from an annotation in a source code file, the annotation being non-executable text within the source code that is compiled and not ignored by the compiler.

8. The method of claim 1, wherein extracted information about the software tested is identified by tags include at least
    a hierarchy level; and
    a user story, having a description of a software requirement, associated with the test case.

9. The method of claim 1, wherein the extracted information about the software tested include at least
    a test case subject;
    a test case description, the description being a plain language explanation of the test case;
    a user story associated with the test case, the user story having a description of a software requirement; and
    a test case hierarchy level.

10. The method of claim 1, wherein the test case repository is in an on-demand service in a machine resident host system for a multi-tenant database system.

11. A method for automatically updating a test case repository, the method comprising:
    sending from a user machine, to a machine resident host system, a request for automatically updating the test case repository, the user machine having a processor, a memory system, and at least one or more machine readable media, the user machine and the machine resident host system forming a system of machines;
    accessing, by the user machine, a test case including one or more machine instructions for testing new code;
    after running the one or more instructions for testing the new code, automatically, extracting, by the user machine, information about the software tested from the test case, therein forming extracted information about the software tested;

receiving, at the user machine, an indication that the repository was updated, with information about the test case and the execution data of the software tested, based on the extracted information about the software tested;

wherein extracted information about the software tested is identified by tags include at least
- a hierarchy level;
- a user story, having a description of a software requirement, associated with the test case;
- a test case subject;
- a test case description, the description being a plain language explanation of the test case;
- a user story associated with the test case, the user story having a description of a software requirement; and
- a test case hierarchy level; and wherein the test case repository is in an on-demand service in a machine resident host system for a multi-tenant database system.

12. The method of claim 11, wherein the information about the software tested are features of the test case which determine where the test case is stored in the test case repository.

13. The method of claim 12, wherein the information about the software tested are contained in at least one comment.

14. The method of claim 11, wherein extracting the information about the software tested includes at least
extracting a first set of characters, a second or more additional sets of characters, the first set of characters delineated by a designated end character, from at least one comment; and
extracting information about the software tested identified by tags, the tags being designated characters that identify what follows as information about the software tested.

15. The method of claim 11, the method further comprising:
extracting a first set of characters, the set of characters delineated by a designated end character from at least one comment, and storing the first set of characters as a test case subject.

16. The method of claim 15, the method further comprising:
extracting a second set of characters from at least one comment, and storing the second set of characters as a plain language description of the test case.

17. The method of claim 11, the method further comprising:
if the test case comment is missing information about the software tested, accessing a test automation suite having at least a test script used for automatically executing the test case;
accessing a test inventory file having at least a catalog of test methods for the test case; and
extracting the missing information about the software tested from either the test automation suite or the test inventory file.

18. A machine-readable medium storing thereon one or more instructions, which when implemented cause a processor to implement a method for automatically updating a test case repository, the method comprising:
receiving at a machine resident host system, a request from a user machine for automatically updating the test case repository, the machine resident host having a processor, a memory system, and at least one or more machine readable media;
wherein the test case repository resides on one or more locations on the at least one machine readable media;
wherein the test case repository stores one or more test case versions with associated prior test case execution data, each test case having a location within the predetermined organization of test cases within the repository to associate in the case repository;
associating, at the machine resident host system, a test case including information extracted about software tested, with test case execution data, data from which the information is extracted being located in a file having source code of the software tested; and
automatically updating, at the machine resident host system, the test case repository in the memory system with the test case based on the information extracted about the software tested;
wherein the information about the software tested is extracted from at least content within a source code file;
wherein extracted information about the software include at least
a position within the predetermined organization of test cases within the repository to associate within the repository, and
a natural language description of information about the software, associated with the test case; and
wherein the test case repository is in an on-demand service in a machine resident host system for a multi-tenant database system.

19. The machine readable medium of claim 18, wherein the extracted information about the software tested are features of the test case which determine where the test case is stored in the QA test case repository.

20. The machine readable medium of claim 18, the method further comprising:
receiving at the machine resident host system, a request from the user machine to view the contents of the QA test case repository; and
displaying a view of the QA test repository that includes a plain language description of stored test cases in response to the request.

21. The machine readable medium of claim 18, the method further comprising:
if a prior version of the test case does not exist in the test repository, inserting the test case into the test case repository at a hierarchy level suitable for the test case; and
uploading a set of execution data associated with the test case.

22. The machine readable medium of claim 18, the method further comprising:
if a prior version of the test case already exists in the test repository, updating a prior test case version with a latest test case version; and
uploading a set of execution data associated with the latest test case.

23. The machine readable medium of claim 18, wherein the information about the software tested are extracted from at least one comment in a source code file, the comment being text within a portion of the source code that is ignored by a compiler.

24. The machine readable medium of claim 18, wherein the information about the software tested are extracted from an annotation in a source code file, the annotation being non-executable text within the source code that is compiled and not ignored by the compiler.

25. The machine readable medium of claim 18, wherein extracted information about the software tested identified by tags include at least
a hierarchy level; and a user story, having a description of a software requirement, associated with the test case.

26. The machine readable medium of claim 18, wherein the extracted information about the software tested include at least
a test case subject;
a test case description, the description being a plain language explanation of the test case;
a user story associated with the test case, the user story having a description of a software requirement; and
a test case hierarchy level.

27. The machine readable medium of claim 18, wherein the test case repository is in an on demand service in a machine resident host system for a multi-tenant database system.

28. A machine-readable medium storing thereon one or more instructions, which when implemented cause a processor to implement a method for automatically updating a test case repository, the method comprising:
sending from a user machine, to a machine resident host system, a request for automatically updating the test case repository, the user machine having a processor, a memory system, and at least one or more machine readable media, the user machine and the machine resident host system being part of a system of machines;
accessing, by the user machine, a test case including one or more machine instructions for testing new code, the test case having information about the software tested;
after running the one or more instructions for testing the new code, automatically extracting, by a machine of the system of machines, the information about the software tested from the test case, therein forming extracted information about the software tested; and
receiving, at the user machine an indication that the repository was updated, with information about the test case and the execution data of the software tested, based on the extracted information about the software tested;
wherein extracted information about the software tested is identified by tags include at least
a hierarchy level;
a user story, having a description of a software requirement, associated with the test case;
a test case subject;
a test case description, the description being a plain language explanation of the test case;
a user story associated with the test case, the user story having a description of a software requirement; and
a test case hierarchy level; and
wherein the test case repository is in an on-demand service in a machine resident host system for a multi-tenant database system.

29. The machine readable medium of claim 28, wherein the information about the software tested are features of the test case which determine where the test case is stored in the test case repository.

30. The machine readable medium of claim 29, wherein the information about the software tested are contained in at least one comment.

31. The machine readable medium of claim 28, wherein extracting the information about the software tested includes at least
extracting a first set of characters, a second or more additional sets of characters, the first set of characters delineated by a designated end character, from at least one comment; and
extracting information about the software tested identified by tags, the tags being designated characters that identify what follows as information about the software tested.

32. The machine readable medium of claim 28, the method further comprising:
extracting a first set of characters, the set of characters delineated by a designated end character from at least one comment, and storing the first set of characters as a test case subject.

33. The machine readable medium of claim 32, the method further comprising:
extracting a second set of characters from at least one comment, and storing the second set of characters as a plain language description of the test case.

34. The machine readable medium of claim 28, the method further comprising:
if the test case comment is missing information about the software tested, accessing a test automation suite having at least a test script used for automatically executing the test case;
accessing a test inventory file having at least a catalog of test methods for the test case; and
extracting the missing information about the software tested from either the test automation suite or the test inventory file.

35. A machine resident host system for automatically updating a test case repository in a multitenant database system, the host system comprising:
a processor system,
a memory system including at least
volatile memory, and
non-volatile memory;
the non-volatile memory including at least one machine readable medium carrying one or more sequences of instructions which when implemented causes the processor system to implement a method comprising:
after running the testing the new code, receiving at a machine resident host system, a request from a user machine for automatically updating the test case repository, the machine resident host having a processor, a memory system, and at least one or more machine readable media;
wherein the test case repository resides on one or more locations on the at least one machine readable media;
wherein the test case repository stores one or more test case versions with associated prior test case execution data,
associating, at the machine resident host system, a test case including information extracted about the software tested, with associated test case execution data, strings of characters from which the information is extracted being located in a file having source code of the software tested; and
automatically updating, at the machine resident host system, the test case repository in the memory system with the test case based on the information extracted about the software tested;
wherein extracted information about the software tested is identified by tags include at least
a hierarchy level;
a user story, having a description of a software requirement, associated with the test case;
a test case subject;
a test case description, the description being a plain language explanation of the test case;

a user story associated with the test case, the user story having a description of a software requirement; and
a test case hierarchy level; and
wherein the test case repository is in an on-demand service in a machine resident host system for a multi-tenant database system.

36. The system of claim 35, wherein the extracted information about the software are features of the test case which determine where the test case is stored in the QA test case repository.

37. The system of claim 35, the method further comprising:
receiving at the machine resident host system, a request from the user machine to view the contents of the QA test case repository; and
displaying a view of the QA test repository that includes a plain language description of stored test cases in response to the request.

38. The system of claim 35, the method further comprising:
if a prior version of the test case does not exist in the test repository, inserting the test case into the test case repository at a hierarchy level suitable for the test case; and
uploading a set of execution data associated with the test case.

39. The system of claim 35, the method further comprising:
if a prior version of the test case already exists in the test repository,
updating a prior test case version with a latest test case version; and
uploading a set of execution data associated with the latest test case.

40. The system of claim 35, wherein the information about the software tested is extracted from at least one comment in a source code file, the comment being text within a portion of the source code that is ignored by a compiler.

41. The system of claim 35, wherein the information about the software is extracted from an annotation in a source code file, the annotation being non-executable text within the source code that is compiled and not ignored by the compiler.

42. The system of claim 35, wherein extracted information about the software identified by tags include at least
a hierarchy level; and
a user story, having a description of a software requirement, associated with the test case.

43. The system of claim 35, wherein the extracted information about the software include at least
a test case subject;
a test case description, the description being a plain language explanation of the test case;
a user story associated with the test case, the user story having a description of a software requirement; and
a test case hierarchy level.

44. The system of claim 35, wherein the test case repository is in an on-demand service in a machine resident host system for a multi-tenant database system.

45. A user system for automatically updating a test case repository in a multi-tenant database system, the user system comprising:
a processor system,
a memory system including at least
volatile memory, and
non-volatile memory;
the non-volatile memory including at least one machine readable medium carrying one or more sequences of instructions which when implemented causes the processor system to implement a method comprising:
sending from a user machine, to a machine resident host system, a request for automatically updating the test case repository, the user machine having a processor, a memory system, and at least one or more machine readable media;
accessing, by the user machine, a test case including one or more machine instructions for testing new code, the test case having attributes;
after running the one or more instructions for testing the new code, extracting, by the user machine, the attributes from the test case therein forming extracted attributes; and
sending, to the machine resident host system, the test case including the extracted attributes, with associated test case execution data;
wherein extracted information about the software tested is identified by tags include at least
a hierarchy level;
a user story, having a description of a software requirement, associated with the test case;
a test case subject;
a test case description, the description being a plain language explanation of the test case;
a user story associated with the test case, the user story having a description of a software requirement; and
a test case hierarchy level; and
wherein the test case repository is in an on-demand service in a machine resident host system for a multi-tenant database system.

46. The system of claim 45, wherein the attributes are features of the test case which determine where the test case is stored in the test case repository.

47. The system of claim 46, wherein the attributes are contained in at least one comment.

48. The system of claim 45, wherein extracting the attributes includes at least
extracting a first set of characters, a second or more additional sets of characters, the first set of characters delineated by a designated end character, from at least one comment; and
extracting attributes identified by tags, the tags being designated characters that identify what follows
as an attribute.

49. The system of claim 45, the method further comprising:
extracting a first set of characters, the set of characters delineated by a designated end character from at least one comment, and storing the first set of characters as a test case subject.

50. The system of claim 49, the method further comprising:
extracting a second set of characters from at least one comment, and storing the second set of characters as a plain language description of the test case.

51. The system of claim 45, the method further comprising:
if the test case comment is missing attributes,
accessing a test automation suite having at least a test script used for automatically executing the test case;
accessing a test inventory file having at least a catalog of test methods for the test case; and
extracting the missing attributes from either the test automation suite or the test inventory file.

* * * * *